United States Patent [19]

Kenyon

[11] 4,438,342

[45] Mar. 20, 1984

[54] NOVEL HYBRID ELECTRIC VEHICLE

[76] Inventor: Keith E. Kenyon, 14435 Hamlin St., Van Nuys, Calif. 91401

[21] Appl. No.: 259,518

[22] Filed: May 1, 1981

Related U.S. Application Data

[63] Continuation of Ser. No. 149,978, May 15, 1980, abandoned.

[51] Int. Cl.³ .............................................. B60L 11/12
[52] U.S. Cl. .................................. 290/45; 180/65 R
[58] Field of Search ............... 310/43, 46, 68 R, 152, 310/156; 290/45; 318/139; 180/65 R

[56] References Cited

U.S. PATENT DOCUMENTS 3,671,788  6/1972  Knudsen et al. ................... 310/156
3,837,419  9/1974  Nakamura ........................... 318/139
3,891,876  6/1975  Herr et al. .......................... 310/154

Primary Examiner—J. V. Truhe
Assistant Examiner—Shelley Wade
Attorney, Agent, or Firm—Bruce L. Birchard

[57] ABSTRACT

By utilizing, in a hybrid (electrical-heat engine) vehicle an alternator which is totally free of elemental iron in its magnetic circuit, the alternator (with appropriate rectification means) can be connected, selectively, in series, parallel or in lieu of the storage battery pack for activating the electrical motor which drives the wheels of the vehicle or any other load mechanically coupled to the electrical motor. Quick surges of power can thus be delivered to the load to achieve, for example, rapid acceleration of a vehicle.

9 Claims, 7 Drawing Figures

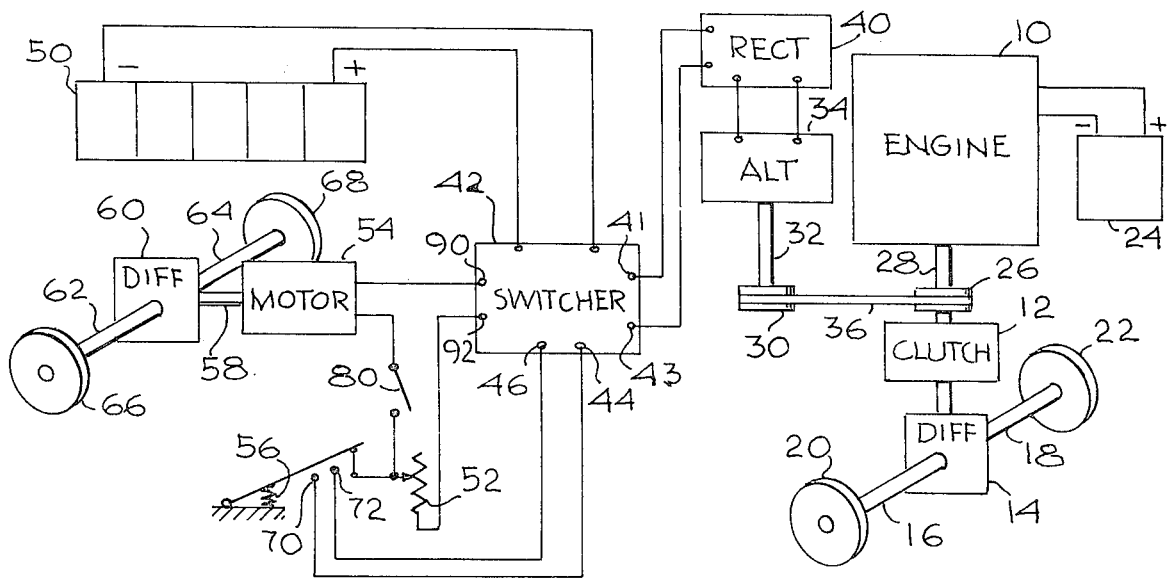
Fig. 1
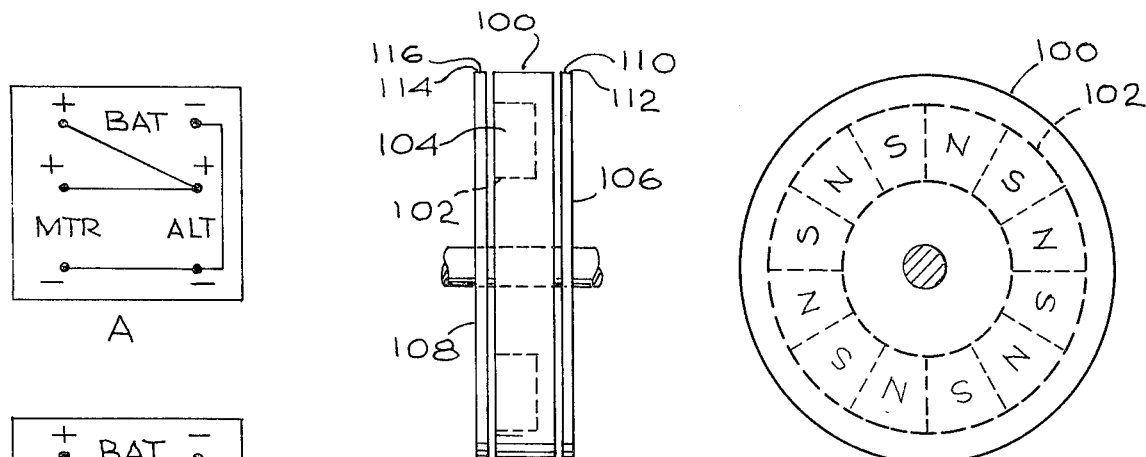
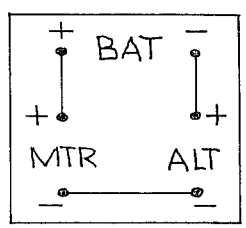
A
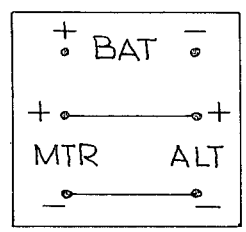
B
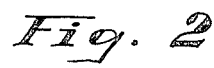
C
Fig. 2
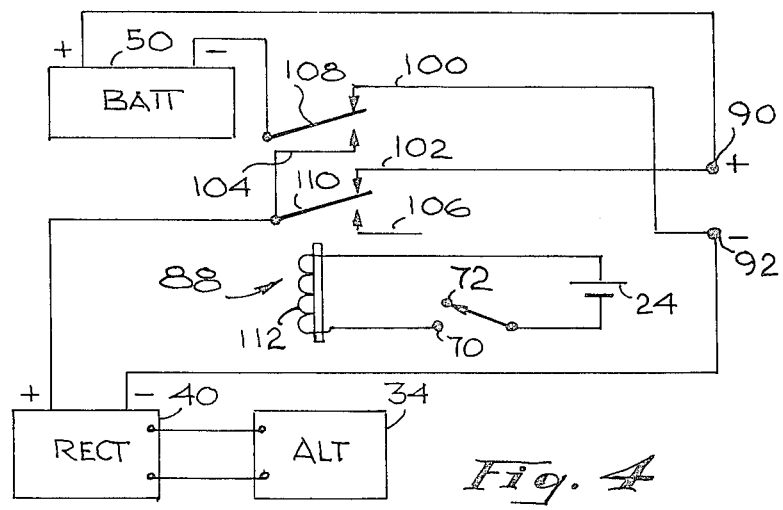
Fig. 3A  Fig. 3B  Fig. 4

NOVEL HYBRID ELECTRIC VEHICLE

This is a continuation of application Ser. No. 149,978 filed May 15, 1980, now abandoned.

RELEVANT CO-PENDING APPLICATION

Reference is made to my co-pending application Ser. No. 23,607 filed Mar. 26, 1979 and entitled, "Totally Ironless Dynamoelectric Machine."

BACKGROUND OF THE INVENTION

1. Field of the Invention

This invention relates to sources of driving power for mechanical loads and, more specifically, to hybrid-drive vehicles.

2. Prior Art

With the advent of the shortage of oil and the rapidly escalating price of it, associated with the economic and international dangers with which this deplorable situation has confronted the world, new types of transportation systems have been proposed. Amongst these is advocated the widespread use of electric cars, since these can utilize any type of fuel, wind, solar, synthetic fuels, coal, water power, hydrogen and nuclear power, for example. Anything that can be used to generate electricity can provide power for electric vehicles. Unfortunately batteries now and in the forseeable future are too heavy to provide much range or performance for electric vehicles. To rectify this situation, the United States Department of Energy has proposed that hybrid vehicles (battery-powered drive train plus a heat-engine-powered drive train), be the interim solution. There are two types of such vehicles, the first being a series hybrid, of which the diesel-electric locomotive is an example. In the series hybrid, a heat engine, usually of the internal combustion type, drives the electric generator powering the electric motors coupled to the wheels. The generator is, in actuality, an electric transmission. The other type is the parallel hybrid in which there is a battery-pack-powered electric drive coupled to the wheels, and in addition there is a heat engine, usually of the internal combustion type, also coupled to the wheels. Usually both drives in a parallel hybrid are coupled to the same set of wheels, but it is possible to have one drive coupled to one set of wheels and the other coupled to another set. When the electric drive is operating in a parallel hybrid, it is desirable to disconnect the heat engine when it is not being used, to avoid high friction losses. On the other hand when the heat engine alone is operating the vehicle, it is not necessary to disconnect the electric drive motor's rotor, since the friction loss is small, and it has the advantage of acting as a flywheel.

Such exhalted scientific organizations as Jet Propulsion Laboratory and its parent, the National Aeronautics and Space Administration, have dismissed the idea of a series hybrid as being too inefficient. To quote Briggs & Stratton engineers, who have developed an effective hybrid using their small 18 horsepower engine, "the first—and simplest—method (to build a hybrid) is to add an engine-driven generator to the electric motor to recharge its batteries. This design adds nothing to the electric motor's performance, only its range, and suffers significant mechanical-electrical-mechanical conversion losses. In short, the series approach is deemed by engineers to be an inefficient one."

The same argument has been used by JPL engineers to describe the use of an electric generator to drive the electric motor as is done with the diesel-electric locomotive. Another detracting argument is that such a generator would be much too heavy for an automobile. Earnest H. Wakefield, in his book, *The Consumer's Electric Car*, states that a series wound electric motor is capable of being used as a transmission without gearing because of its ability to increase its torque by the square of the current increase. Thus, an electric transmission (or series hybrid) can be more efficient than a standard transmission at lower speed range by reducing the large low speed losses. To a lesser extent this argument holds true with a shunt wound motor or even a conventional permanent magnet motor. Even JPL and Briggs & Stratton agree that the electric motor can be an effective and efficient method to start an automobile, especially if it is a series wound D.C. motor. Briggs & Stratton is quoted as saying its "hybrid gasoline-electric powered car takes advantage of the complementary characteristics of its two powerplants—the low speed power of the electric motor and the high speed performance of the gasoline engine." So we have a complementary situation. A series hybrid would be very useful and efficient in low speed city driving, while a parallel hybrid engine with a 1:1 gear ratio to the differential can perform efficiently at the higher speeds.

In overcoming the initial inertia of rest of a vehicle or other load it would be desirable to add the rectified current from an engine driven alternator to that from the battery pack, applying the sum to the electrical drive motor. With conventional alternator structure there is much elemental iron in the magnetic circuit of the alternator and passing the current from the battery pack to the motor thru the alternator would be unthinkable since the iron would saturate, causing a loss of output current from the alternator. The alternator would become merely a load.

Therefore, it is an object of this invention to overcome the general disadvantages set forth hereinbefore.

It is a further object of this invention to provide an improved hybrid electrical-heat engine drive for a mechanical load.

It is an additional object of this invention to provide an electrical drive system which provides, selectively, high torque for a desired period of time.

SUMMARY OF THE INVENTION

By utilizing as an alternator one of the type invented by me and described in my copending application Ser. No. 23,607 filed Mar. 26, 1979 and entitled "Totally Ironless Dynamoelectric Machine," it is possible to put the rectified output of such alternator in series with the battery pack powering the electric drive motor so as to give a surge of mechanical power without the magnetic saturation and loss of output which would be experienced if a conventional alternator were it to be utilized similarly.

Thus, with the invention described here, the ironless alternator may, selectively, be placed in series with, in parallel with, or in lieu of the battery pack providing electrical power to the electrical motor driving the mechanical load, e.g. the wheels of a hybrid vehicle. The ironless windings in disc-armature alternators utilized in this invention are light in weight. These alternators maintain high efficiencies at all speeds. If the electrical drive motor for the vehicle is a series-wound D.C.

motor its torque increases as the square of the amperage flowing to it.

Thus, greatly improved acceleration can be realized with the combination acording to this invention.

BRIEF DESCRIPTION OF THE DRAWINGS

The features of the present invention which are believed to be novel are set forth with particularity in the appended claims. The present invention, both as to its organization and manner of operation, together with further objects and advantages thereof, may be best understood by reference to the following description taken in conjunction with the accompanying drawings, in which:

FIG. 1 is a schematic diagram of a hybrid vehicle according to my invention;

FIGS. 2A–2C are schematic diagrams of certain switching patterns for the switching portion of the diagram of FIG. 1.

FIG. 3A is an edge view of a disc armature—field alternator construction usable in this invention; and FIG. 3B is a side view of a portion of FIG. 3A.

DETAILED DESCRIPTION OF THE PREFERRED EMBODIMENTS

In FIG. 1, heat engine 10, which may be an internal combustion engine, a solar engine, a nuclear engine, or the like is coupled through clutch 12 (which may be an automatic one-way clutch) to differential 14, which, in turn is coupled to axles 16 and 18 which carry wheels 20 and 22, respectively. Because of the features of this invention, a gear ratio of 1:1 may be maintained from engine 10 to differential 14, which assures maximum efficiency for the power train.

An auxiliary battery 24 may be provided in connection with the ignition system of engine 10.

A drive pulley 26 is provided on engine shaft 28 for power take-off to pulley 30 on shaft 32 of alternator 34. Belt 36 intercouples pulleys 26 and 30 for power transfer between engine 10 and alternator 34. Alternator 34 is of the type described in my copending application Ser. No. 23,607 filed Mar. 26, 1979 and entitled "Totally Ironless Dynamoelectric Machine." Such a machine has no elemental iron in its magnetic circuit. The alternator may be of the disc armature or drum type described in that application. The field is provided by permanent magnets, preferably of the ceramic ferrite type. One example is shown in FIGS. 3A and 3B.

In FIGS. 3A and 3B a die-cast aluminum disc 100 contains pockets 102 for receiving ceramic magnets 104. In this configuration both bi-polar and one homo-polar surface are covered by aluminum. There are no radial conductors separating magnets, one from the other.

Because of the non-magnetic nature of aluminum both coils 106 and 108 intercept lines of flux from magnets 104 and produce AC output voltage at terminals 110, 112 and 114, 116, respectively. This is only one possible configuration for alternator 34. My prior application may be seen for other configurations.

The output of alternator 34 goes through semiconductor rectifier 40 where it is changed to D-C and is applied to terminals 41, 43 of switcher 42. Switcher 42 may be a set of electromechanical relays with appropriate contacts or the proper combination of triacs or other thyristors. Both solid state and electromechanical relays and these circuits are well known and need not be described here.

The control signal for switcher 42 is applied to terminals 44, 46. Of course, manual switching may be utilized.

The switching modes which can be achieved by switcher 42 are shown in FIGS. 2A, 2B and 2C.

In FIG. 2A, rectified output from alternator 34 is connected in parallel with the output of battery pack 50 and is applied, through speed control 52 to electrical drive motor 54. Speed control 52 is a variable electrical resistor which may be mechanically coupled to foot pedal or accelerator 56. The output shaft 58 of motor 54 is coupled through differential 60 to axles 62 and 64 which drive wheels 66, 68, respectively.

In the switching mode shown in FIG. 2A, alternator 34 may be considered merely a charging means for battery 50.

If sudden acceleration is needed the switching mode of FIG. 2B may be desirable. In that mode, battery 50 and alternator 34 are in series with each other, electrically, and are connected across motor 54. If motor 54 is a series-wound motor its output torque will go up as the square of the current flowing through it. Thus, by putting battery 54 and alternator 34 (through rectifier 40) in series, the current thru motor 54 will be significantly increased and its torque increased as the square of the increased current. Impressive acceleration of the vehicle or other load will result. The changes to series feed from parallel feed can be accomplished in response to a depression of foot pedal 56 so as to close contacts 70, 72.

This is a similar phenomenon to the depression of the accelerator in a conventional car when it is desired to put the car in "passing gear." A relay circuit which will accomplish this end is shown in FIG. 4.

In FIG. 4, relay 88 includes fixed contacts 100, 102, 104 and 106, and switch arms 108 and 110. Relay 88 also includes solenoid 112 which is connected in series with switch contacts 70, 72 and auxiliary battery 24. When contacts 70, 72 are not closed the relay contacts are as shown in FIG. 4. Battery 50 and rectifier 40 (which is rectifying the output of alternator 34) are connected in parallel across output terminals 90, 92 of switcher 42. Alternator 34 (with rectifier 40) may be considered as merely charging battery 50. When contacts 70, 72 are closed, as by depressing the accelerator foot pedal, solenoid 112 is energized and switch arms 108 and 110 move into contact with contacts 104, 106, respectively. As a result, battery 50 and rectifier 40 are connected in series across output terminals 90, 92 and motor 54 receives a surge of current. Its torque output (if it is series wound) goes up as the square of such current; and the load (e.g., the vehicle) is accelerated. The relay may be solid state or electromechanical.

FIG. 2C shows the switching mode for running motor 54 solely from alternator 34, with battery 50 eliminated from the circuit. Engine 10 drives alternator 34, the rectified output from which runs motor 54, with speed control being provided by means of variable resistor 52, which may be adjusted by means of foot pedal 56.

Manual means not shown may be provided on the control panel of the vehicle to select the switching mode of FIG. 2, and, hence the source of operating current for electrical drive motor 54.

For maximum fuel economy in highway driving the circuit to electrical motor 54 is broken by a switch 80, for example, and automatic one-way clutch 12 couples heat engine 10 to differential 14 with a 1:1 gear ratio. For maximum efficiency in city driving, automatic one-way clutch 12 de-couples heat engine 10 from differential 14 and switch 80 is closed, permitting electrical drive motor 54, alone, to propel the vehicle. This clutch change can be accomplished automatically by well-known speed sensing devices, such as centrifugal devices.

While particular embodiments of the present invention have been shown and described, it will be obvious to those skilled in the art that changes and modifications may be made without departing from my invention in its broader aspects, and, therefore, the aim of the appended claims is to cover all such changes and modifications as fall within the true spirit and scope of my invention.

What is claimed is:

1. A hybrid heat-engine, electrical motor power plant, including:
   a heat engine having a first output shaft;
   an electrical motor having input terminals for connection to a source of electrical power and having a second output shaft for coupling to a mechanical load;
   an electrical alternator having electrical output terminals and an input shaft mechanically coupled to said first output shaft for driving said alternator from said heat engine;
   rectifying means electrically coupled to said electrical output terminals of said alternator and responsive to alternating current from said alternator to produce direct current;
   battery means having power terminals;
   switcher means having first input terminals coupled to said rectifying means, second input terminals coupled to said power terminals of said battery means and output terminals;
   coupling means for coupling said output terminals of said switcher means to said input terminals of said electrical motor;
   switcher control means coupled to said switcher and responsive to the activation thereof to selectively connect said battery means and said rectifying means in a predetermined electrical mode across said output terminals of said switcher means;
   said electrical alternator having no elemental iron in its magnetic circuit.

2. Apparatus according to claim 1 in which said coupling means includes a variable resistor.

3. Apparatus according to claim 1 in which said predetermined electrical mode is electrical series.

4. Apparatus according to claim 1 in which said switcher control means is a remote switch.

5. Apparatus according to claim 1 in which said switcher control means includes a foot pedal and a switch activated thereby.

6. Apparatus according to claim 1 in which said switcher includes at least one electromechanical relay.

7. Apparatus according to claim 1 in which said switcher includes a plurality of thyristors.

8. Apparatus according to claim 1 in which said alternator has a permanent-magnetfield.

9. Apparatus according to claim 8 in which said permanent-magnet field includes ceramic-ferrite magnets.

* * * * *